(12) United States Patent
Takazoe (10) Patent No.: US 10,785,208 B2
(45) Date of Patent: Sep. 22, 2020

(54) AUTHENTICATION METHOD, AUTHENTICATION SYSTEM, AND COMMUNICATION DEVICE

(71) Applicant: PANASONIC INTELLECTUAL PROPERTY MANAGEMENT CO., LTD., Osaka (JP)

(72) Inventor: Tomoki Takazoe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 92 days.

(21) Appl. No.: 15/559,803

(22) PCT Filed: Feb. 1, 2016

(86) PCT No.: PCT/JP2016/000484
§ 371 (c)(1),
(2) Date: Sep. 19, 2017

(87) PCT Pub. No.: WO2016/151987
PCT Pub. Date: Sep. 29, 2016

(65) Prior Publication Data
US 2018/0069850 A1 Mar. 8, 2018

(30) Foreign Application Priority Data
Mar. 26, 2015 (JP) .................. 2015-064983

(51) Int. Cl.
*H04L 29/06* (2006.01)
*H04L 9/08* (2006.01)
(Continued)

(52) U.S. Cl.
CPC ........ *H04L 63/0823* (2013.01); *G06F 21/445* (2013.01); *H04L 9/08* (2013.01);
(Continued)

(58) Field of Classification Search
CPC ......... H04L 63/0823; H04L 9/08; H04L 9/32; H04L 9/3263; H04L 63/068; H04L 63/0869; G06F 21/445
See application file for complete search history.

(56) References Cited

U.S. PATENT DOCUMENTS

2001/0016911 A1 * 8/2001 Obana ................... H04L 9/3255
713/180
2005/0033983 A1 2/2005 Takekawa et al.
(Continued)

FOREIGN PATENT DOCUMENTS

JP H11-340969 A 12/1999
JP 2004-247799 A 9/2004
(Continued)

OTHER PUBLICATIONS

Takashi Shinzaki et al., "IoT Security for Utilization of Big Data: Mutual Authentication Technology and Anonymization Technology for Positional Data," Oct. 2016, pp. 52-60 (Year: 2016).*
(Continued)

*Primary Examiner* — Luu T Pham
*Assistant Examiner* — Canh Le
(74) *Attorney, Agent, or Firm* — McDermott Will & Emery LLP (57) ABSTRACT

A controller and a device generate a shared key by performing mutual authentication using a public key certificate of the controller and a public key certificate of the device. The controller and the device set an expiry for the shared key to one of the expiry of the public key certificate of the controller and the expiry of the public key certificate of the device. The controller and the device perform the mutual authentication using neither the public key certificate of the
(Continued)

controller nor the public key certificate of the device, but the shared key, if the expiry set for the shared key has not passed.

4 Claims, 9 Drawing Sheets

(51) Int. Cl.
  *H04L 9/32* (2006.01)
  *G06F 21/44* (2013.01)
(52) U.S. Cl.
  CPC .............. *H04L 9/32* (2013.01); *H04L 9/3263* (2013.01); *H04L 63/068* (2013.01); *H04L 63/0869* (2013.01)

(56) References Cited

U.S. PATENT DOCUMENTS

| | | | |
|---|---|---|---|
| 2005/0102503 A1 | 5/2005 | Imai | |
| 2006/0020782 A1* | 1/2006 | Kakii | H04L 9/3273 713/156 |
| 2007/0055865 A1* | 3/2007 | Kakii | H04L 9/3263 713/156 |
| 2008/0059976 A1* | 3/2008 | Miura | H04L 63/0869 719/316 |
| 2008/0178004 A1* | 7/2008 | Wei | H04W 12/04031 713/171 |
| 2011/0268274 A1* | 11/2011 | Qiu | H04L 9/0844 380/270 |
| 2013/0097421 A1* | 4/2013 | Lim | G06F 21/602 713/167 |
| 2013/0315565 A1* | 11/2013 | Yamaguchi | H04L 9/0825 386/259 |
| 2015/0373048 A1* | 12/2015 | Siddiqui | H04W 12/08 713/151 |
| 2016/0249176 A1* | 8/2016 | Pearce | H04W 4/029 |

FOREIGN PATENT DOCUMENTS

| | | |
|---|---|---|
| JP | 2005-026842 A | 1/2005 |
| JP | 2005-071328 A | 3/2005 |
| JP | 2005-130444 A | 5/2005 |

OTHER PUBLICATIONS

Mohammad Mehdi Karbasioun et al., "Asymmetric distribution of communications in INternet key exchange protocol,", 2008, pp. 1-5. (Year: 2008).*

International Search Report and Written Opinion issued in International Patent Application No. PCT/JP2016/000484, dated Apr. 19, 2016; with partial English translation.

* cited by examiner

| DEVICE ID | CERTIFICATE ID | SHARED KEY | GROUP KEY | SESSION KEY | SESSION REMAINING TIME |
|---|---|---|---|---|---|
| D1 | P1 | 01234... | 11223... | 11122... | 13:40:50 |
| D2 | P2 | 98765... | | 22233... | 13:41:24 |
| D3 | P3 | 19283... | | 33344... | 16:02:13 |
| ... | ... | ... | | ... | ... |

| CONTROLLER ID | CERTIFICATE ID | SHARED KEY | GROUP KEY | SESSION KEY | SESSION REMAINING TIME |
|---|---|---|---|---|---|
| C1 | Q1 | 01234... | 11223... | 11122... | 13:40:50 |
| ... | ... | ... | ... | ... | ... |

AUTHENTICATION METHOD, AUTHENTICATION SYSTEM, AND COMMUNICATION DEVICE

TECHNICAL FIELD

The present invention relates to an authentication method, an authentication system, and a communication device that use a shared key.

BACKGROUND ART

For an authentication system where devices perform mutual authentication using public key certificates issued by a certification authority, a technique is known whereby each device generates a shared key using the public key certificate at their initial registration so that subsequent authentication is simplified using the shared key (see Patent Literature (PTL) 1). Such an authentication system verifies, for example, the expiry of the public key certificate upon registration.

CITATION LIST

Patent Literature

PTL 1: Japanese Unexamined Patent Application Publication No. 2004-247799

SUMMARY OF THE INVENTION

Technical Problem

The technique disclosed in PTL 1, however, has a problem that the authentication succeeds even when the expiry of the public key certificate has passed, as long as the shared key is authentic. Since the authentication using the shared key is based on the authenticity of the public key certificate, the authentication should fail after the expiry of the public key certificate passes, and mutual authentication should be performed again using new public key certificates.

In view of the above problem, it is an object of the present invention to provide an authentication method, an authentication system, and a communication device that enable mutual authentication using a shared key with the expiry of a public key certificate taken into consideration, and that can increase the communication security and reliability.

Solutions to Problem

In order to achieve the above object, a first aspect of the present invention is an authentication method by which a first device and a second device perform mutual authentication, the first device having a secret key and a public key certificate of the first device, the second device having a secret key and a public key certificate of the second device, the method including: generating a shared key by the first device and the second device performing the mutual authentication using the public key certificate of the first device and the public key certificate of the second device; setting an expiry for the shared key to one of an expiry of the public key certificate of the first device and an expiry of the public key certificate of the second device; and performing the mutual authentication by the first device and the second device using neither the public key certificate of the first device nor the public key certificate of the second device, but the shared key, if the expiry set for the shared key has not passed.

A second aspect of the present invention is an authentication system including a first device that has a secret key and a public key certificate of the first device, and a second device that has a secret key and a public key certificate of the second device and performs mutual authentication with the first device, the system including: a certificate authenticator that allows the first device and the second device to generate a shared key by performing the mutual authentication using the public key certificate of the first device and the public key certificate of the second device; an expiry setter that sets an expiry for the shared key to one of an expiry of the public key certificate of the first device and an expiry of the public key certificate of the second device; and a shared key authenticator that allows the first device and the second device to perform the mutual authentication using neither the public key certificate of the first device nor the public key certificate of the second device, but the shared key, if the expiry set for the shared key has not passed.

A third aspect of the present invention is a communication device that performs mutual authentication with a target device having a secret key and a public key certificate of the target device, the communication device including: a storage that stores a secret key and a public key certificate of the communication device; a certificate authenticator that generates a shared key by performing the mutual authentication with the target device, using the public key certificate stored in the storage and the public key certificate of the target device; an expiry setter that sets an expiry for the shared key generated by the certificate authenticator, to one of an expiry of the public key certificate of the communication device and an expiry of the public key certificate of the target device; and a shared key authenticator that performs the mutual authentication with the target device using neither the public key certificate stored in the storage nor the public key certificate of the target device, but the shared key, if the expiry set for the shared key has not passed.

Advantageous Effect of Invention

The present invention makes it possible to provide an authentication method, an authentication system, and a communication device that enable mutual authentication using a shared key with the expiry of a public key certificate taken into consideration, and that can increase the communication security and reliability.

DESCRIPTION OF EXEMPLARY EMBODIMENT

Hereinafter, an authentication method, an authentication system, and a communication device according to the present embodiment will be described with reference to the drawings. Note that the embodiment described below shows a preferable, specific example of the present invention. Therefore, the numerical values, shapes, materials, structural elements, the arrangement and connection of the structural elements, processes (steps), the processing order of the processes, etc., illustrated in the following embodiment are mere examples, and are therefore not intended to limit the present invention. As such, among the structural elements in the following embodiment, structural elements not recited in any one of the independent claims which indicate the broadest inventive concepts will be described as arbitrary structural elements. Note that each drawing is a schematic illustration and not necessarily a precise illustration. In the following description of the drawings, the same or similar reference signs are given to the same or similar elements, and overlapping description of such elements is omitted.

Embodiment

The present embodiment describes an authentication method, an authentication system, and a communication device that enable mutual authentication using a shared key with the expiry of a public key certificate taken into consideration, and that can increase the communication security and reliability.

(Authentication System)

Figure 1:
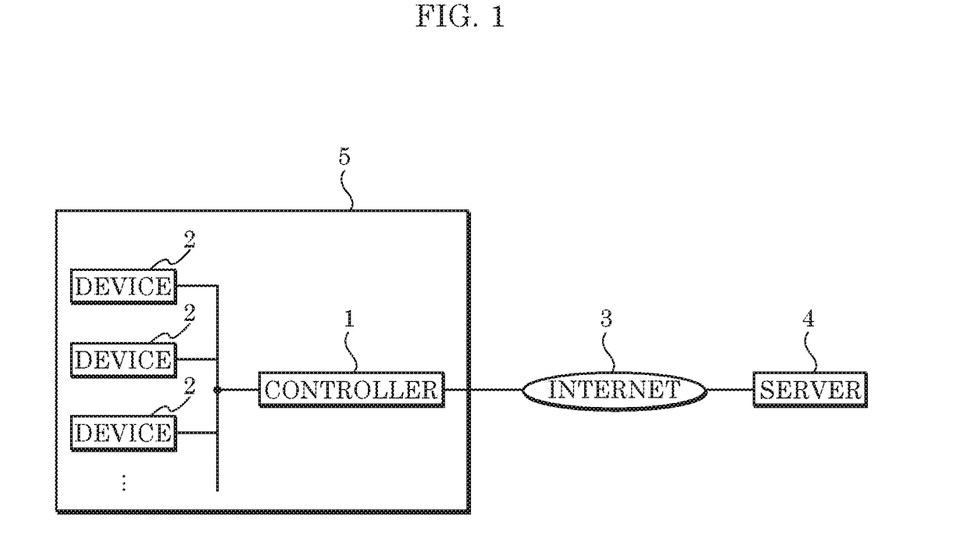
FIG. 1 is a block diagram illustrating the basic configuration of an authentication system according to an embodiment of the present invention.

As illustrated in FIG. 1, the authentication system according to the present embodiment includes controller 1, a plurality of devices 2, and server 4 connected to controller 1 via Internet 3, that is a communication line, to communicate with controller 1. Server 4 is a certification authority that issues public key certificates to controller 1 and the plurality of devices 2, and manages the issued public key certificates.

Controller 1 (a first device) is, for example, a controller in a home energy management system (HEMS) that manages power consumption, residual generated power, etc., of the plurality of devices 2. Controller 1 is a communication device connected to the plurality of devices 2 to communicate with the plurality of devices 2. Controller 1 constitutes HEMS 5 with the plurality of devices 2 by registering the plurality of devices 2 through mutual authentication with the plurality of devices 2.

Figure 2:
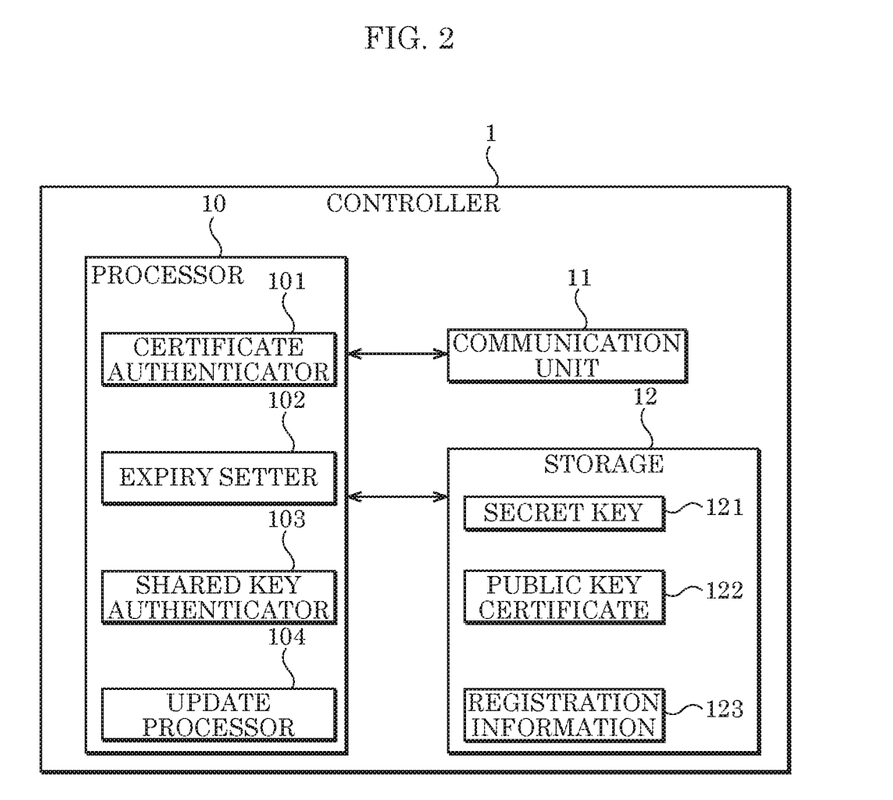
FIG. 2 is a block diagram illustrating the basic configuration of a controller included in the authentication system according to the embodiment of the present invention.

As illustrated in FIG. 2, controller 1 includes: processor 10; communication unit 11 that communicates with others according to control by processor 10; and storage 12 that stores a program and/or information such as various data. The communication performed by communication unit 11 may be wireless communication and may be wired communication. Storage 12 stores secret key 121 and public key certificate 122 of controller 1 and registration information 123 related to device(s) 2 already registered.

Figure 3:
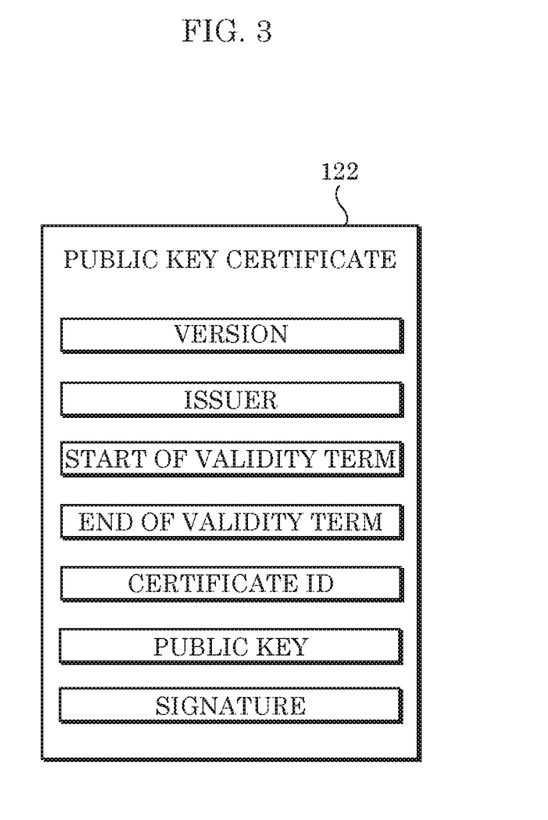
FIG. 3 is a block diagram illustrating the basic data configuration of a public key certificate used in the authentication system according to the embodiment of the present invention.

As illustrated in FIG. 3, public key certificate 122 includes the version, the issuer, the start of the validity term, the end of the validity term (expiry), and a certificate identifier (ID) of public key certificate 122, as well as a public key of controller 1 and the signature of server 4. The public key of public key certificate 122 corresponds to secret key 121. The signature of public key certificate 122 is created using a secret key of server 4. Public key certificate 122 is issued by server 4, and stored in storage 12 when controller 1 is manufactured.

Figure 4:
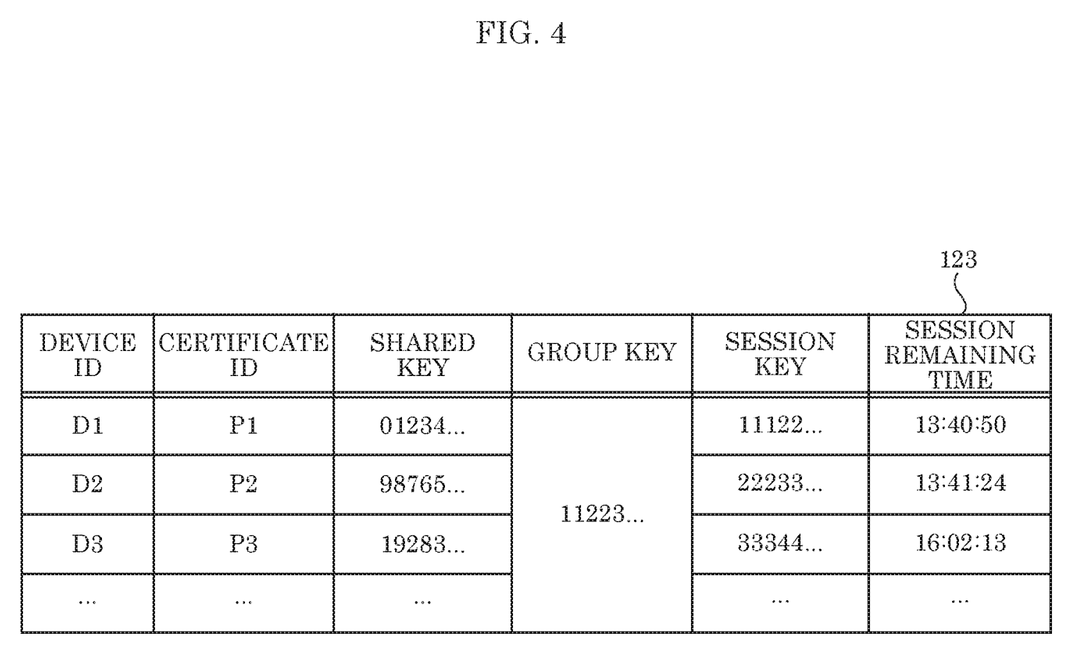
FIG. 4 is a block diagram illustrating the basic data configuration of registration information used in the authentication system according to the embodiment of the present invention.

As illustrated in FIG. 4, registration information 123 includes a device ID that identifies device(s) 2 already registered, a certificate ID that identifies public key certificate 222 of each device 2 (see FIG. 6), a shared key (a pre-shared key), a group key, a session key, and a session remaining time. The shared key is shared between controller 1 and each device 2. The group key is used for encrypting and decrypting information that controller 1 transmits to each device 2 simultaneously. Devices 2 that belong to the same group share the same group key with controller 1. The session key is used for encrypting and decrypting unicast communication between controller 1 and each device 2. The session remaining time is the remaining time during which a session is valid, and is set between controller 1 and each device 2.

Processor 10 includes, as the logical structure, certificate authenticator 101, expiry setter 102, shared key authenticator 103, and update processor 104. Processor 10 includes a processing device such as a central processing unit (CPU) as the hardware structure.

Certificate authenticator 101 generates a shared key to share with device 2 which is a target device to be authenticated, by performing mutual authentication with device 2 using public key certificate 222 of device 2 and public key certificate 122. Expiry setter 102 sets the expiry for the shared key generated by certificate authenticator 101, to one of the expiry of public key certificate 122 and the expiry of public key certificate 222.

Shared key authenticator 103 performs mutual authentication with device 2 using neither public key certificate 122 nor public key certificate 222, but the shared key generated by certificate authenticator 101, if the expiry set for the shared key has not passed. Update processor 104 updates public key certificate 122 to new public key certificate 122 if the expiry set for the shared key has passed.

Device 2 (a second device) is: a load device such as an air conditioner, a refrigerator, or a lighting device; a power source device such as a solar cell or a storage battery; or a smart meter, for example. Device 2 is a communication device that joins HEMS 5 by being registered by controller 1, and performs encrypted communication with controller 1. Device 2 may be the same type of device as controller 1 having a control function, a management function, etc. Note that when two or more devices having a management function are present in the same network, only the first-connected device performs the management function, and the later-connected device(s) does not perform the management function.

Figure 5:
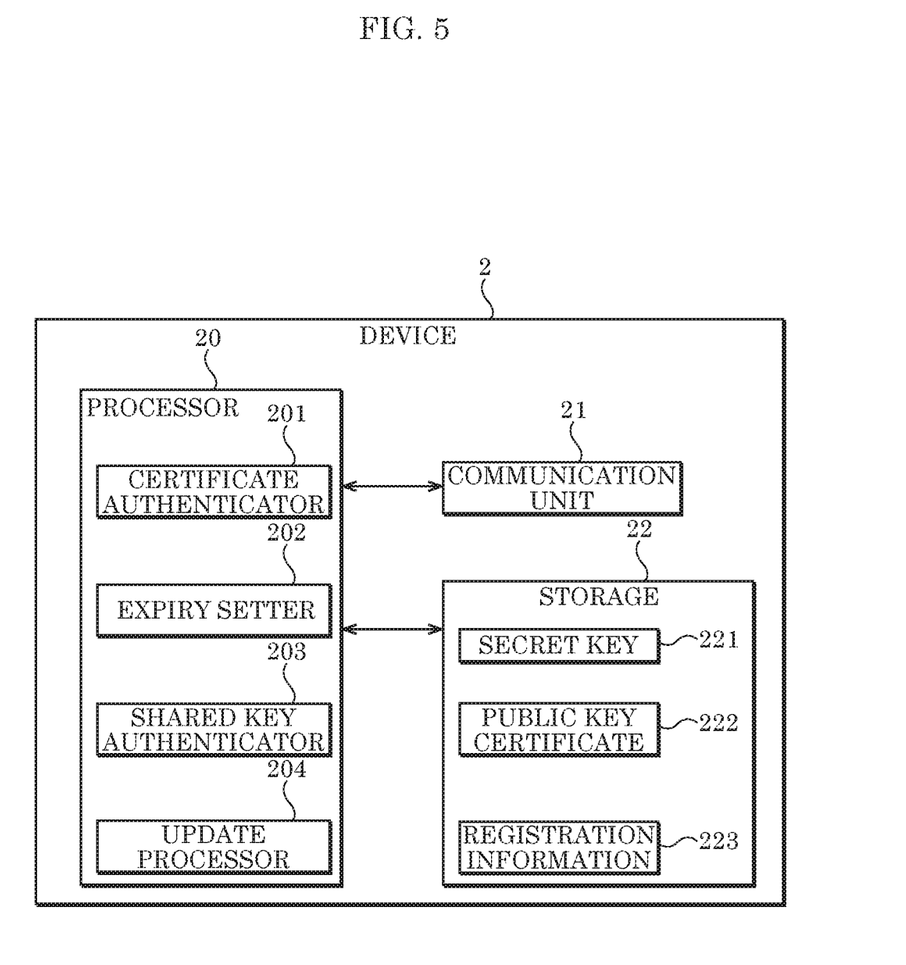
FIG. 5 is a block diagram illustrating the basic configuration of a device included in the authentication system according to the embodiment of the present invention.

As illustrated in FIG. 5, each device 2 includes: processor 20; communication unit 21 that communicates with controller 1 according to control by processor 20; and storage 22 that stores a program and/or various data. The communication performed by communication unit 21 may be wireless communication and may be wired communication. Storage 22 stores secret key 221 and public key certificate 222 of device 2 and registration information 223 related to controller 1 which registers device 2.

Similar to public key certificate 122, public key certificate 222 includes the version, the issuer, the start of the validity term, the end of the validity term (expiry), and a certificate ID of public key certificate 222, as well as a public key of device 2 and the signature of server 4. The public key of public key certificate 222 corresponds to secret key 221. The signature of public key certificate 222 is created using the secret key of server 4. Public key certificate 222 is issued by server 4, and stored in storage 22 when device 2 is manufactured.

Figure 6:
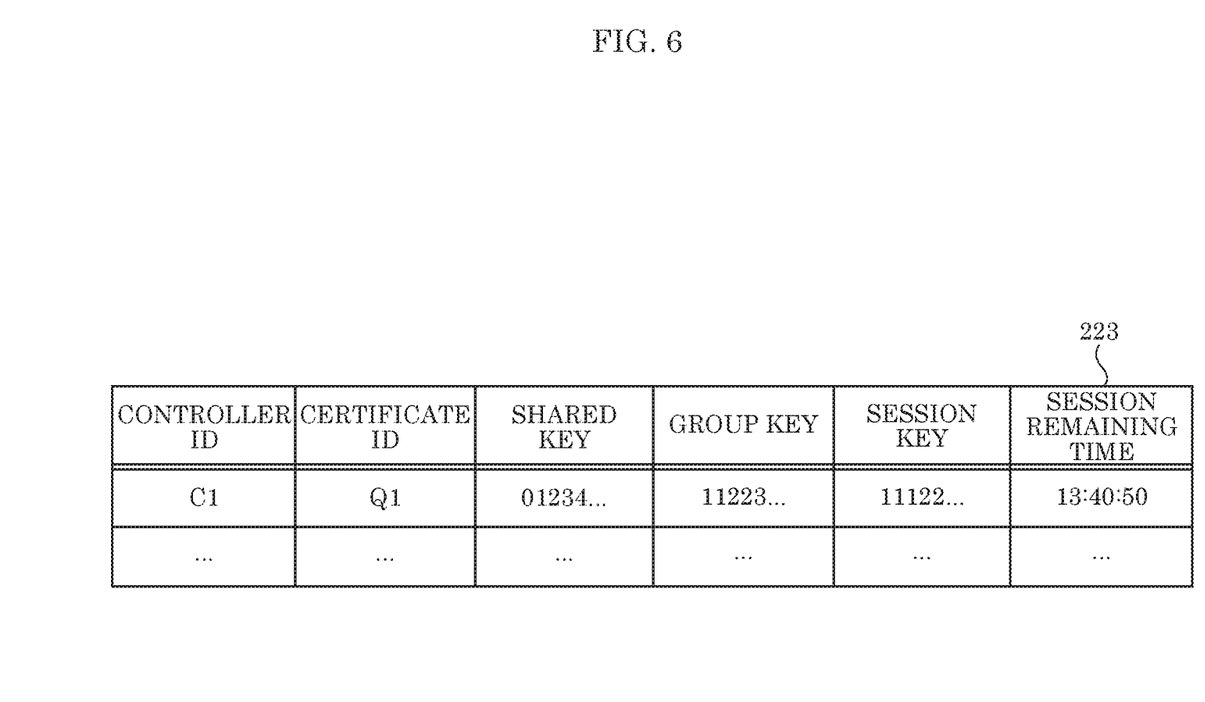
FIG. 6 is a block diagram illustrating the basic data configuration of registration information used in the authentication system according to the embodiment of the present invention.

As illustrated in FIG. 6, registration information 223 includes a controller ID that identifies controller 1 that registers device 2, a certificate ID that identifies public key certificate 122 of controller 1, a shared key, a group key, a session key, and a session remaining time. The shared key is shared between controller 1 and each device 2. The group key is used for encrypting and decrypting information that controller 1 transmits to devices 2 simultaneously. The session key is used for encrypting and decrypting unicast communication performed between controller 1 and device 2. The session remaining time is the remaining time during which the session is valid, and is set between controller 1 and device 2.

Processor 20 includes, as the logical structure, certificate authenticator 201, expiry setter 202, shared key authenticator 203, and update processor 204. Processor 20 includes a processing device such as a CPU as the hardware structure.

Certificate authenticator 201 generates a shared key to share with controller 1 that is a target device to be authenticated, by performing mutual authentication with controller 1 using public key certificate 122 of controller 1 and public key certificate 222. Expiry setter 202 sets the expiry for the shared key generated by certificate authenticator 201, to one of the expiry of public key certificate 222 and the expiry of public key certificate 122.

Shared key authenticator 203 performs mutual authentication with device 2 using neither public key certificate 222 nor public key certificate 122, but the shared key generated by certificate authenticator 201, if the expiry set for the shared key has not passed. Update processor 204 updates public key certificate 222 to new public key certificate 222 if the expiry set for the shared key has passed.

(Authentication Method)

Figure 7:
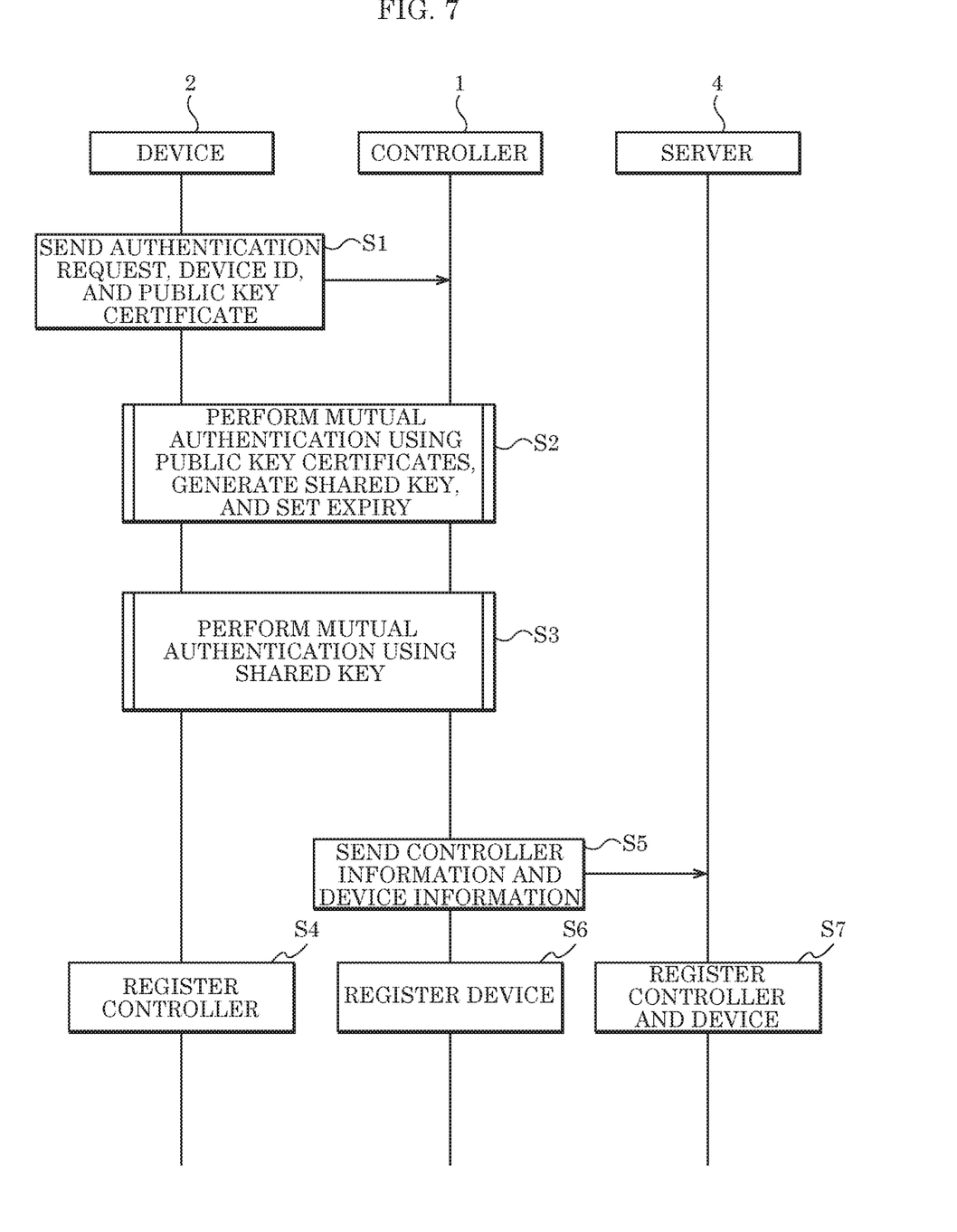
FIG. 7 is a sequence diagram illustrating an operation of the authentication system according to the embodiment of the present invention.

With reference to the sequence diagram illustrated in FIG. 7, an authentication method used by the authentication system according to the present embodiment will be described.

First, in Step S1, certificate authenticator 201 of device 2 sends (i) an authentication request that requests authentication using public key certificates, (ii) the device ID of device 2, and (iii) public key certificate 222 of device 2, to controller 1 via communication unit 21. Communication unit 11 of controller 1 receives the authentication request, the device ID, and public key certificate 222 sent from device 2 in Step S1.

In Step S2, certificate authenticator 101 of controller 1 performs mutual authentication with certificate authenticator 201, using public key certificate 122 and public key certificate 222 in response to the authentication request obtained via communication unit 11. The mutual authentication performed in Step S2 is based on a public key infrastructure (PKI).

By succeeding in the mutual authentication through verification of the authenticity of each other's public key certificate, certificate authenticator 101 and certificate authenticator 201 generate a shared key using a key exchange method. Expiry setter 102 and expiry setter 202 set the expiry for the shared key shared by controller 1 and device 2, to one of the expiry of public key certificate 122 and the expiry of public key certificate 222, using certificate authenticator 101 and certificate authenticator 201. Note that certificate authenticator 101 and certificate authenticator 201 finish the processing if the mutual authentication using the public key certificates has failed.

In Step S3, shared key authenticator 103 and shared key authenticator 203 perform mutual authentication using neither public key certificate 122 nor public key certificate 222, but the shared key, if the expiry set for the shared key shared between controller 1 and device 2 has not passed. When shared key authenticator 103 and shared key authenticator 203 succeed in the mutual authentication by verifying the authenticity of each other's shared key, they set a group key, a session key, and a session validity term, etc, if needed. Note that shared key authenticator 103 and shared key authenticator 203 finish the processing if the mutual authentication using the shared key has failed.

In Step S4, shared key authenticator 203 registers, as registration information 223, the shared key and the set group key, session key, and session validity term etc., in association with the controller ID of controller 1 and the certificate ID of public key certificate 122.

In Step S5, shared key authenticator 103 sends, to server 4 via communication unit 11, the controller ID of controller 1 and the certificate ID of public key certificate 122 as well as the device ID of device 2 and the certificate ID of public key certificate 222. At this time, communication unit 11 performs secure socket layer (SSL) communication with server 4.

In Step S6, shared key authenticator 103 registers, as registration information 223, the shared key and the set group key, session key, and session validity term etc., in association with the device ID of device 2 and the certificate ID of public key certificate 222.

In Step S7, server 4 receives the controller ID of controller 1 and the certificate ID of public key certificate 122 as well as the device ID of device 2 and the certificate ID of public key certificate 222, all of which have been sent in Step S5, and registers controller 1 and device 2 as authenticated communication devices. Note that the operations in Step S5 and Step S7 may be omitted.

(Mutual Authentication Using Public Key Certificates)

Figure 8:
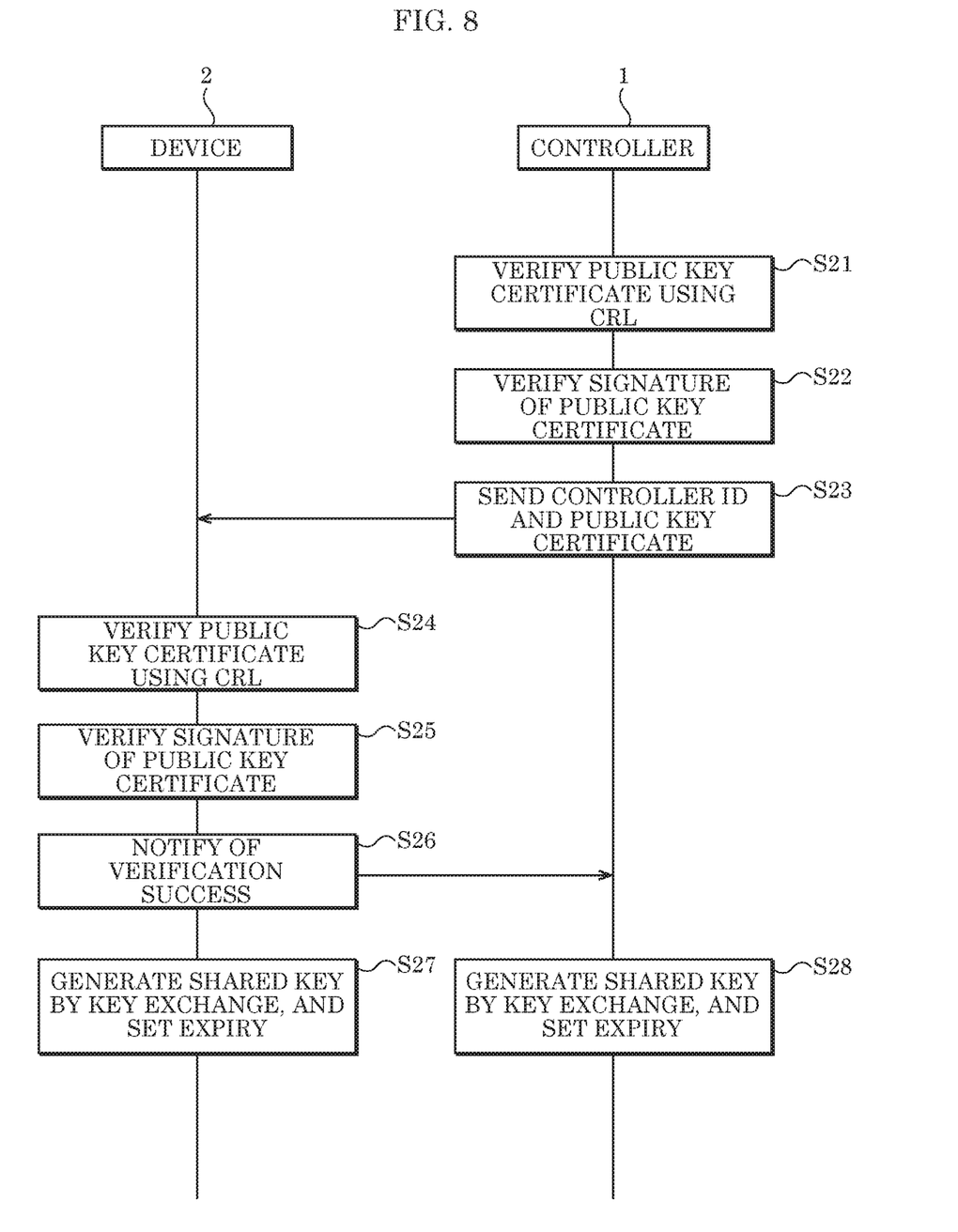
FIG. 8 is a sequence diagram illustrating mutual authentication using public key certificates in the authentication system according to the embodiment of the present invention.

With reference to the sequence diagram illustrated in FIG. 8, an example of the mutual authentication performed using the public key certificates in Step S2 of the sequence diagram illustrated in FIG. 7 will be described.

In Step S21, certificate authenticator 101 verifies the validity of public key certificate 222 sent from device 2, using a certificate revocation list (CRL), for example. Other than that, certificate authenticator 101 also verifies the expiry of public key certificate 222. Certificate authenticator 101 proceeds to Step S22 if public key certificate 222 is confirmed to be valid, and finishes the processing if public key certificate 222 is determined to be invalid.

In Step S22, certificate authenticator 101 verifies the signature of public key certificate 222 using a public key of server 4. Certificate authenticator 101 proceeds to Step S23 if the signature of public key certificate 222 is confirmed to be authentic, and finishes the processing if the signature of public key certificate 222 is determined to be invalid.

In Step S23, certificate authenticator 101 sends, to device 2 that has sent the authentication request, the controller ID and public key certificate 122 of controller 1 via communication unit 11. Certificate authenticator 201 of device 2 obtains, via communication unit 21, the controller ID and public key certificate 122 sent from controller 1.

In Step S24, certificate authenticator 201 verifies the validity of public key certificate 122 based on the CRL, the expiry, etc. Certificate authenticator 201 proceeds to Step S25 if public key certificate 222 is confirmed to be valid, and finishes the processing if public key certificate 222 is determined to be invalid.

In Step S25, certificate authenticator 201 verifies the signature of public key certificate 122 using the public key of server 4. Certificate authenticator 201 proceeds to Step S26 if the signature of public key certificate 122 is confirmed to be authentic, and finishes the processing if the signature of public key certificate 122 is determined to be invalid.

In Step S26, certificate authenticator 201 sends to controller 1 a success notification notifying that the verification of public key certificate 122 has been successful. Note that the electronic signature system and the verification method used in Step S21 to Step S26 can be based on the elliptic curve digital signature algorithm (ECDSA).

In Step S27 and Step S28, certificate authenticator 101 and certificate authenticator 201 generate a shared key using a key exchange system. The key exchange system can be the elliptic curve diffie-hellman key exchange (ECDH) system. Further, the shared key can have a key length of 128 bits in accordance with an advanced encryption standard (AES). A hash value is calculated from a shared value, and the high-order 128 bits of the calculated hash value can be used as the key length of the shared key.

Expiry setter 102 and expiry setter 202 set the expiry for the shared key generated by certificate authenticator 101 and certificate authenticator 201, to one of the expiry of public key certificate 122 and the expiry of public key certificate 222. Expiry setter 102 and expiry setter 202 set the expiry for the shared key to a closer one of the expiry of public key certificate 122 and the expiry of public key certificate 222, for example. Storage 12 and storage 22 store the shared key and the expiry set for the shared key in association with each other.

(Mutual Authentication Using Shared Key)

With reference to the sequence diagram illustrated in FIG. 9, an example of the mutual authentication performed using the shared key in Step S3 of the sequence diagram illustrated in FIG. 7 will be described. The mutual authentication using the shared key is performed based on the challenge-response authentication.

In Step S301 and Step S302, shared key authenticator 103 and shared key authenticator 203 verify the expiry set for the shared key. The expiry is verified at a predetermined time. For example, the expiry may be verified when, for example, the communication session between controller 1 and device 2 is updated.

If the expiry of the shared key has passed, certificate authenticator 101 stops the current processing and waits for a new authentication request from device 2. Alternatively, certificate authenticator 101 may send a new authentication request to device 2 using current public key certificate 122. Shared key authenticator 103 proceeds to Step S303 if the expiry of the shared key has not passed. In Step S303, shared key authenticator 103 generates arbitrary random number A, and sends random number A to device 2 via communication unit 11.

In Step S304, shared key authenticator 203 encrypts, using the shared key, random number A obtained from controller 1 via communication unit 21, to calculate encrypted random number a. Further, shared key authenticator 203 generates arbitrary random number B. In Step S305, shared key authenticator 203 sends encrypted random number a and random number B to controller 1 via communication unit 21.

In Step S306, shared key authenticator 103 obtains, via communication unit 11, encrypted random number a and random number B from device 2, and decrypts encrypted random number a using the shared key. Shared key authenticator 103 determines that the verification of random number A is successful and proceeds to Step S307 if the decrypting result and random number A match, and finishes the processing if the decrypting result and random number A do not match.

In Step S307, shared key authenticator 103 encrypts, using the shared key, random number B sent from device 2, to calculate encrypted random number b.

In Step S308, shared key authenticator 103 generates a group key if needed. The group key can have an AES key length of 128 bits, for example. Alternatively, shared key authenticator 103 refers to registration information 123 to obtain a group key already generated. In Step S309, shared key authenticator 103 generates a session key. The session key can have an AES key length of 128 bits, for example.

In Step S310, shared key authenticator 103 sets a predetermined session validity term (for example, 24 hours or 72 hours). In Step S311, shared key authenticator 103 encrypts the group key generated or obtained in Step S308 and the session key generated in Step S309, using the shared key. Note that the processing in Step S308 to Step S311 is performed if the group key and the session key need to be generated for communication, and can be omitted.

In Step S312, shared key authenticator 103 sends encrypted random number b, the encrypted group key and session key, and the session validity term to device 2 via communication unit 11. Communication unit 21 of device 2 receives encrypted random number b, the encrypted group key and session key, and the session validity term from controller 1.

In Step S313, shared key authenticator 203 decrypts, using the shared key, encrypted random number b obtained from communication unit 21. Shared key authenticator 203 determines that the verification of random number B is successful and proceeds to Step S314 if the decrypting result and random number B match, and finishes the processing if the decrypting result and random number B do not match.

In Step S314, shared key authenticator 203 decrypts the encrypted group key and session key, using the shared key. Further, in Step S315, shared key authenticator 203 sends to controller 1 a success notification notifying that the verification of random number B has been successful.

(Processing Performed if the Expiry has Passed)

Figure 9:
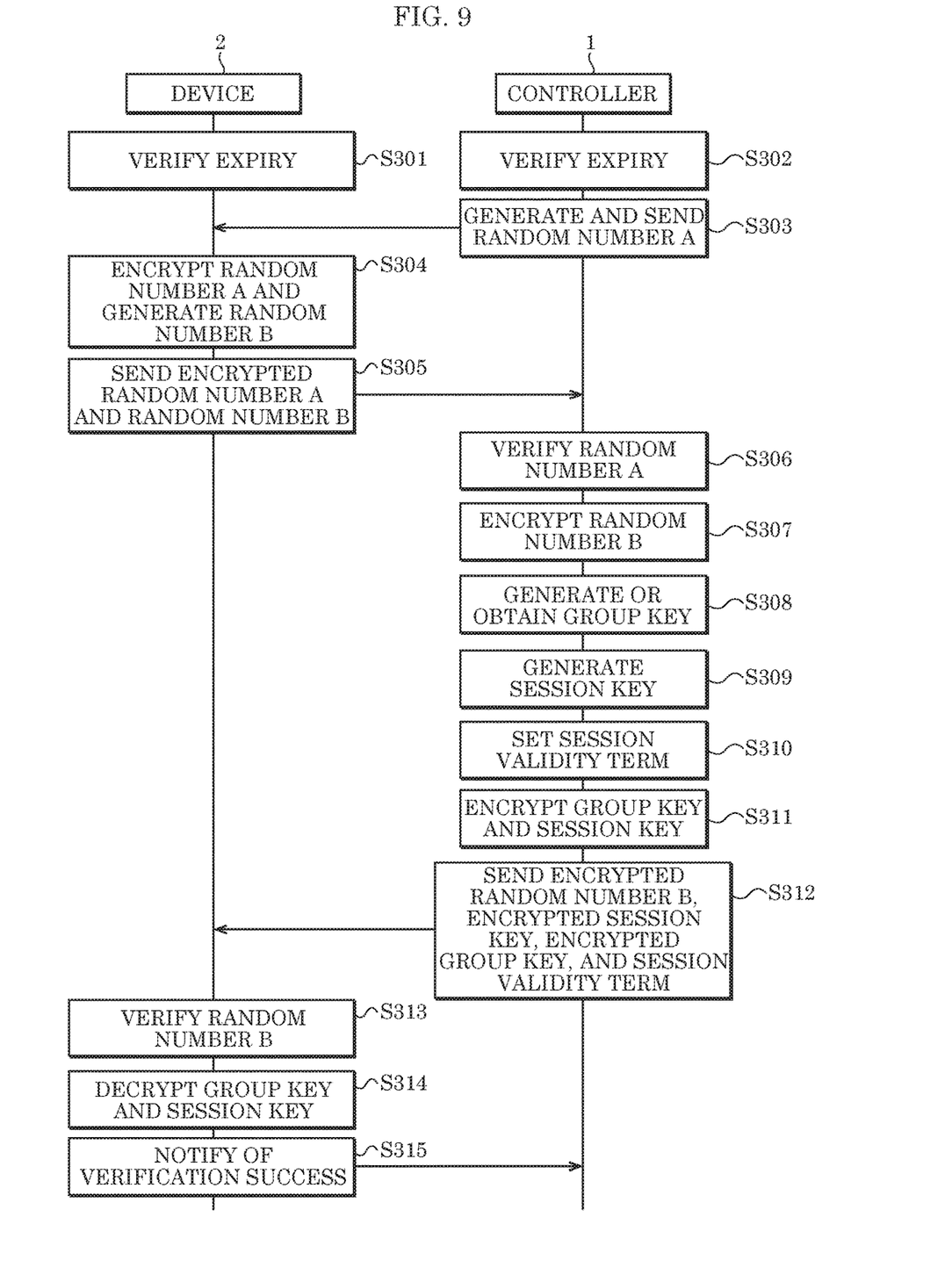
FIG. 9 is a sequence diagram illustrating mutual authentication using a shared key in the authentication system according to the embodiment of the present invention.
Figure 10:
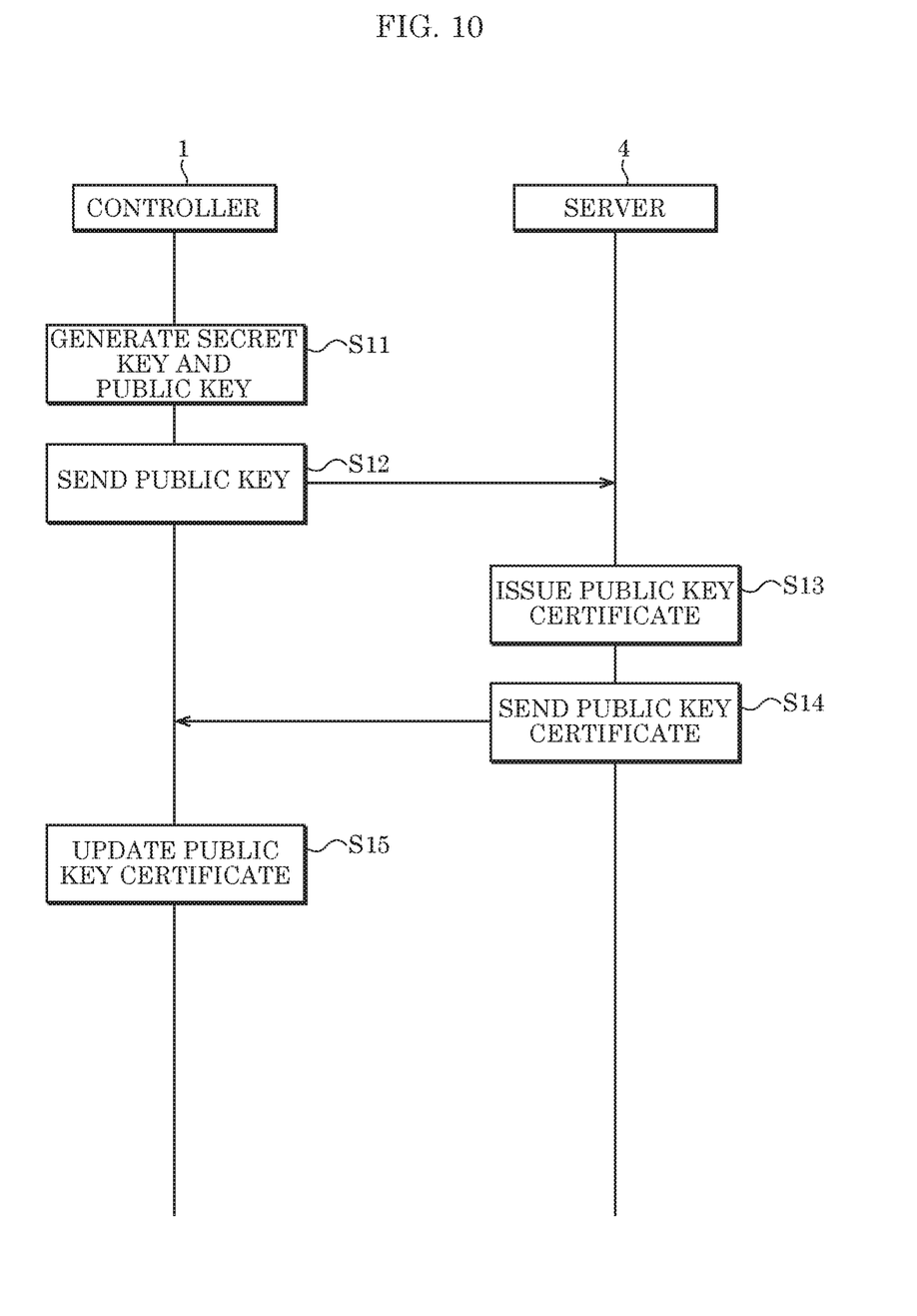
FIG. 10 is a sequence diagram illustrating an update of a public key certificate in the authentication system according to the embodiment of the present invention.

With reference to the sequence diagram illustrated in FIG. 10, the following describes an example of other processing performed if the expiry is found to have passed as a result of the verification of the expiry of the shared key in Step S301 and Step S302 of the sequence diagram illustrated in FIG. 9.

In Step S11, update processor 104 generates new secret key 121 and a new public key corresponding to new secret key 121. In Step S12, update processor 104 sends the new public key to server 4 via communication unit 11.

In Step S13, server 4 receives the public key sent in Step S12, adds the signature etc., of server 4 to the public key, and issues new public key certificate 122. In Step S14, server 4 sends new public key certificate 122 to controller 1.

In Step S15, update processor 104 receives new public key certificate 122 sent in Step S14, and replaces public key certificate 122 stored in storage 12 with new public key certificate 122 so that new public key certificate 122 is stored (i.e., updates public key certificate 122). By doing so, controller 1 can perform mutual authentication with device 2 using valid, new public key certificate 122, and generate a shared key for which new expiry is set.

With the authentication system according to the present embodiment, setting the expiry for the shared key to the expiry of public key certificate 122 or the expiry of public key certificate 222 enables mutual authentication using the shared key with the expiry of the public key certificate taken into consideration, thus increasing the communication security and reliability.

Moreover, with the authentication system according to the present embodiment, setting the expiry for the shared key to a closer one of the expiry of public key certificate 122 and the expiry of public key certificate 222 further increases the communication security and reliability.

In addition, with the authentication system according to the present embodiment, verifying the expiry every time the session is updated makes the detection of an invalid shared key more efficient, thereby further increasing the communication security and reliability.

Other Embodiments

Although an embodiment has been described above, the description and the drawings that make up a part of this disclosure should not be understood as limiting the present invention. A person skilled in the art would arrive at various alternative embodiments, examples, and operational techniques based on this disclosure.

For example, in the embodiment described above, the same processing may be performed in the sequence diagrams illustrated in FIG. 7 to FIG. 10, even when controller 1 and device 2 change places.

The present invention encompasses various embodiments etc., that are not described herein. Therefore, the technical scope of the present invention should be determined only by matters specifying the invention according to the scope of the claims considered to be reasonable based on the above description.

REFERENCE MARKS IN THE DRAWINGS 1 controller (first device, communication device)
2 device (second device, target device)
12 storage
101, 201 certificate authenticator
102, 202 expiry setter
103, 203 shared key authenticator
104, 204 update processor
121, 221 secret key
122, 222 public key certificate

The invention claimed is:

1. An authentication method for a home energy management system including a controller and a device to be controlled by the controller, the controller and the device performing mutual authentication, the controller having a secret key and a public key certificate of the controller, the device having a secret key and a public key certificate of the device, the public key certificate of the controller and the public key certificate of the device being issued by a server to which the controller is coupled through a network, the method comprising:
    (a) performing the mutual authentication using the public key certificate of the controller and the public key certificate of the device;
    (b) selecting one of the public key certificate of the controller and the public key certificate of the device, wherein the selected one of the public key certificate of the controller and the public key certificate of the device expires earlier than another one of the public key certificate of the controller and the public key certificate of the device;
    (c) using an expiry of the selected one of the public key certificate of the controller and the public key certificate of the device to set an expiry for a shared key generated by the controller and the device;
    (d) performing the mutual authentication by the controller and the device using neither the public key certificate of the controller nor the public key certificate of the device, but the shared key,
    (e) verifying the expiry of the shared key every time a communication session between the controller and the device is updated,
    (f) requesting, by the controller, the server to issue a new public key certificate for the controller in response to passing the expiry set for the shared key, wherein the expiry set for the shared key is the expiry of the public key certificate of the controller;
    (g) updating, by the controller, the public key certificate of the controller to the new public key certificate from the server; and
    (h) performing the mutual authentication using the new public key certificate of the controller and a new shared key generated by the controller and the device.

2. The authentication method according to claim 1, wherein the controller generates a new secret key of the controller and a new public key corresponding to the new secret key, and updates the public key certificate of the controller to the new public key certificate using the new public key.

3. A home energy management system coupled to a server, the home energy management system including a controller that has a secret key and a public key certificate of the controller, a device that has a secret key and a public key certificate of the device and performs mutual authentication with the controller, the server being coupled to the controller through a network, the public key certificate of the controller being issued by the server, the controller and the device including processors, respectively, programmed to:
    perform the mutual authentication using the public key certificate of the controller and the public key certificate of the device;
    select one of the public key certificate of the controller and the public key certificate of the device, wherein the selected one of the public key certificate of the controller and the public key certificate of the device expires earlier than another one of the public key certificate of the controller and the public key certificate of the device;

use an expiry of the selected one of the public key certificate of the controller and the public key certificate of the device to set an expiry for a shared key generated by the controller and the device;

perform the mutual authentication using neither the public key certificate of the controller nor the public key certificate of the device, but the shared key;

verify the expiry of the shared key every time a communication session between the controller and the device is updated;

request, by the controller, the server to issue a new public key certificate for the controller in response to passing the expiry set for the shared key, wherein the expiry set for the shared key is the expiry of the public key certificate of the controller;

update, by the controller, the public key certificate of the controller to the new public key certificate from the server; and perform the mutual authentication using the new public key certificate of the controller and a new shared key generated by the controller and the device.

4. A controller in a home energy management system performing mutual authentication with a target device in the home energy management system, the target device having a secret key and a public key certificate of the target device, a public key certificate of the controller being issued by a server to which the controller is coupled through a network, the controller comprising:

a memory that stores a secret key and the public key certificate of the controller; and a processor programmed to:

perform the mutual authentication with the target device, using the public key certificate stored in the storage and the public key certificate of the target device;

select one of the public key certificate of the controller and the public key certificate of the target device, wherein the selected one of the public key certificate of the controller and the public key certificate of the target device expires earlier than another one of the public key certificate of the controller and the public key certificate of the target device;

use an expiry of the selected one of the public key certificate of the controller and the public key certificate of the target device to set an expiry for a shared key generated by the controller and the device;

perform the mutual authentication with the target device using neither the public key certificate stored in the storage nor the public key certificate of the target device, but the shared key;

verify the expiry of the shared key every time a communication session between the controller and the device is updated;

request the server to issue a new public key certificate for the controller in response to passing the expiry set for the shared key, wherein the expiry set for the shared key is the expiry of the public key certificate of the controller;

update the public key certificate stored in the storage to the new public key certificate from the server; and perform the mutual authentication with the target device using the new public key certificate and a new shared key generated by the controller and the device.

* * * * *